US010743080B2

(12) United States Patent
Dai et al.

(10) Patent No.: US 10,743,080 B2
(45) Date of Patent: Aug. 11, 2020

(54) CONTROL POINT DISCOVERY

(71) Applicant: Hewlett Packard Enterprise Development LP, Houston, TX (US)

(72) Inventors: Zhi-Jie Dai, Shanghai (CN); Martin Schwarze, Burnaby (CA); Mu-Jin Liu, Shanghai (CN); Bo Wang, Shanghai (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/319,224

(22) PCT Filed: Jul. 30, 2014

(86) PCT No.: PCT/US2014/048946
§ 371 (c)(1),
(2) Date: Dec. 15, 2016

(87) PCT Pub. No.: WO2016/018318
PCT Pub. Date: Feb. 4, 2016

(65) Prior Publication Data
US 2017/0127144 A1    May 4, 2017

(51) Int. Cl.
*H04N 21/61* (2011.01)
*H04N 21/226* (2011.01)
(Continued)

(52) U.S. Cl.
CPC ..... *H04N 21/6125* (2013.01); *H04L 41/0213* (2013.01); *H04N 7/10* (2013.01);
(Continued)

(58) Field of Classification Search
CPC .......... H04N 21/6168; H04N 21/2385; H04N 21/6118; H04N 21/2747; H04N 21/60;
(Continued)

(56) References Cited

U.S. PATENT DOCUMENTS 6,704,288 B1    3/2004 Dziekman et al.
6,754,622 B1 *  6/2004 Beser ................ H04L 29/12009
                                           370/485
(Continued)

OTHER PUBLICATIONS

International Searching Authority, "Notification of Transmittal of the International Search Report and the Written Opinion", PCT/US2014/048946, dated Apr. 22, 2015, 11 pages.
(Continued)

*Primary Examiner* — Mulugeta Mengesha
*Assistant Examiner* — Alazar Tilahun
(74) *Attorney, Agent, or Firm* — Patent Law Group LLP

(57) ABSTRACT

An example method is described in which a controller initiates, with a control point, control point discovery for an endpoint managed by the control point. The controller, receives, from the control point, a message in response to the initiation of control point discovery. The message is an Internet Protocol Detail Record (IPDR) message or Simple Network Management Protocol (SNMP) message that includes registration information of the endpoint. Based on the registration information of the endpoint, the controller determines an association between the control point and the endpoint. This allows the controller to apply a controlling function on the control point when the endpoint accesses a service via the control point.

11 Claims, 7 Drawing Sheets

(51) Int. Cl.
*H04N 21/64* (2011.01)
*H04N 7/10* (2006.01)
*H04L 12/24* (2006.01)

(52) U.S. Cl.
CPC ..... *H04N 21/2265* (2013.01); *H04N 21/6118* (2013.01); *H04N 21/6175* (2013.01)

(58) Field of Classification Search
CPC ........... H04N 21/6125; H04N 21/6175; H04N 21/2265; H04N 7/10; H04N 21/6402; H04N 21/2396; H04L 41/0213
See application file for complete search history.

(56) References Cited

U.S. PATENT DOCUMENTS

| | | | |
|---|---|---|---|
| 7,068,597 B1 | 6/2006 | Fijolek et al. | |
| 7,107,326 B1 | 9/2006 | Fijolek et al. | |
| 8,005,083 B1* | 8/2011 | Diep | 370/389 |
| 8,144,594 B2 | 3/2012 | Woundy et al. | |
| 8,160,068 B2 | 4/2012 | Pfeffer et al. | |
| 8,351,898 B2 | 1/2013 | Raleigh et al. | |
| 8,750,279 B2 | 6/2014 | Riley et al. | |
| 2005/0163060 A1* | 7/2005 | Riley | H04L 47/781 370/254 |
| 2010/0020821 A1 | 1/2010 | Droms et al. | |
| 2010/0246401 A1* | 9/2010 | Woundy | H04L 12/2801 370/236 |
| 2011/0200055 A1 | 8/2011 | Liva et al. | |
| 2012/0095858 A1* | 4/2012 | Dunstan | G06Q 10/00 705/26.1 |
| 2012/0297061 A1* | 11/2012 | Pedigo | H04L 43/12 709/224 |
| 2013/0174186 A1* | 7/2013 | Kelsen | H04N 21/2543 725/2 |

OTHER PUBLICATIONS

Understanding IPDR Service Flow Counters for Computing Internet Usage, (Manual), Proceedings of Active Broadband Networks, Dec. 2012.

* cited by examiner

CONTROL POINT DISCOVERY

BACKGROUND

Cable networks were originally established to transmit television signals to subscriber premises, such as homes and offices. These networks were made up of co-axial cables designed to transmit analog television signals. As technology advances, cable networks are used to transmit digital signals such as digital data signals, digital television signals and telephony signals. The digital signals may be transmitted using hybrid fibre-coaxial (HFC) cables.

DETAILED DESCRIPTION

In a cable network, control points may be used to apply certain functions and controls for traffic flows that flow to and from endpoints via the control points. Entities that utilize the control points for this purpose may be referred to as controllers. For example, the control points may be cable modem termination systems (CMTS), and the controllers may be policy servers that apply controlling functions on the control points. The process of discovering information concerning a control point in order to allow a controller to apply a controlling function is referred to as control point discovery.

Packet Cable, a result of cooperative effort undertaken for the benefit of the cable industry at the direction of CableLabs (a registered trademark), introduces a control point discovery approach that uses Network Layer Signalling (NLS) protocol. However, in order to support Packet Cable Version 2.0, it is necessary for network service providers to replace or upgrade, for example, control points to support NLS. The replacement or upgrade is time consuming and expensive, especially when there are hundreds if not thousands of control points in the cable network.

Figure 1:
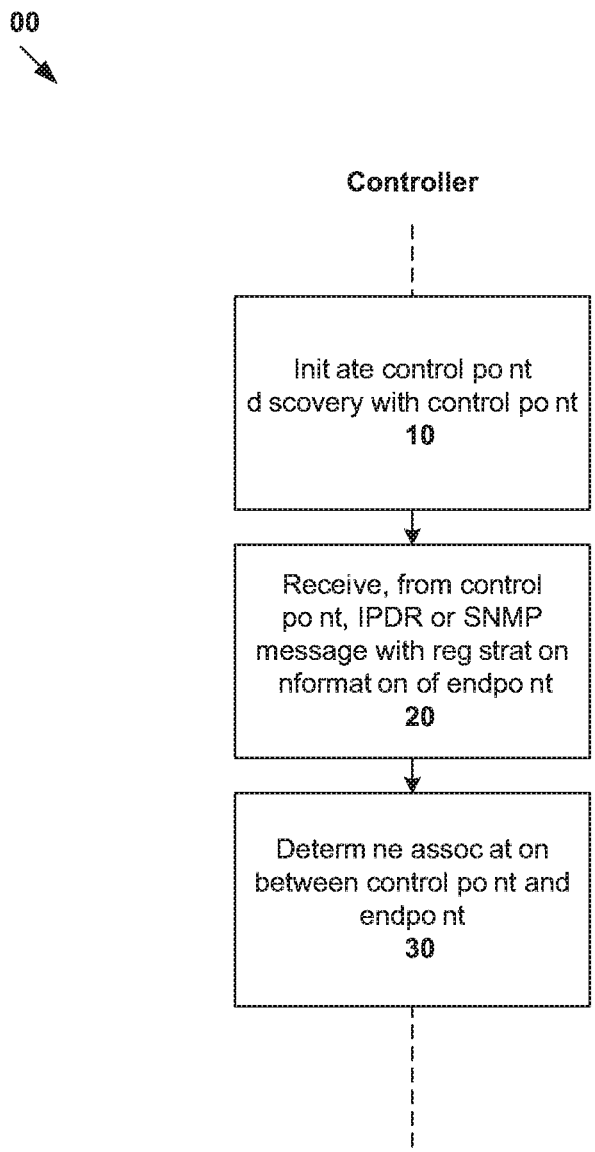
FIG. 1 is a flowchart of an example process for control point discovery.

According to examples of the present disclosure, control point discovery may be performed using management tools that are generally already supported by control points. For example, Internet Protocol Detail Record (IPDR) or Simple Network Management Protocol (SNMP) may be used during control point discovery to obtain registration information of endpoints managed by a control point. In more detail, FIG. 1 is flowchart of example process 100 for control point discovery. Process 100 may include one or more operations, functions, or actions illustrated by one or more blocks, such as blocks 110 to 130. The various blocks may be combined into fewer blocks, divided into additional blocks, and/or eliminated based upon the desired implementation.

At block 110, a controller initiates, with a control point, control point discovery for an endpoint managed by the control point. At block 120, the controller receives, from the control point, a message in response to the initiation of control point discovery at block 110. The message may be an IPDR message or SNIVIP message that includes registration information of the endpoint. At block 130, based on the registration information of the endpoint, the controller determines an association between the control point and the endpoint to allow the controller to apply a controlling function on the control point when the endpoint accesses a service via the control point. For example, the controller may determine the association by analysing the registration information of the endpoint.

Since IPDR and SNMP are generally already supported by control points and controllers for other purposes, example process 100 may leverage them for control point discovery, without necessitating expensive replacement or upgrade to implement the new NLS protocol specified in Packet Cable version 2. Using example process 100, associations between control points and endpoints may be discovered dynamically and updated as the cable network changes. Throughout the present disclosure, the term "endpoint" may refer generally to any suitable subscriber device, such as customer premise equipment (CPE), or cable modem connecting the CPE to a control point. The association between a control point and an endpoint at block 130 may include an association between the control point and a CPE, or an association between the control point and a cable modem, or both. In the following examples, an example cable network will be explained with reference to FIG. 2, an example IPDR-based control point discovery process with reference to FIG. 3 and FIG. 4, and an example SNMP-based control point discovery process with reference to FIG. 5, FIG. 6A and FIG. 6B.

Cable Network

Figure 2:
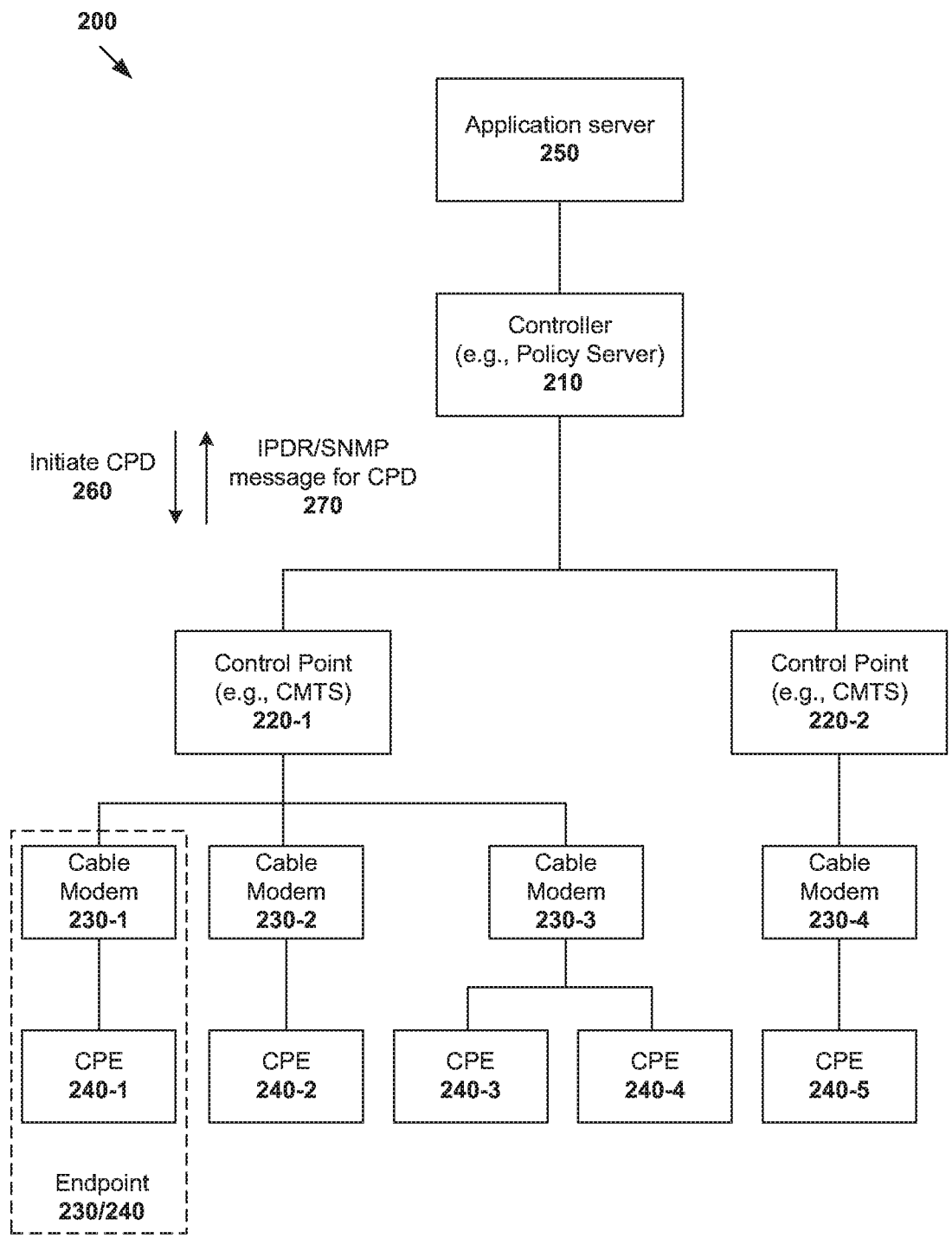
FIG. 2 is a schematic diagram of an example cable network in which control point discovery may be implemented.

FIG. 2 is a schematic diagram of example cable network 200 in which control point discovery may be implemented. Example cable network 200 may be used for any suitable applications or services, such as high-speed Internet services, Voice over Internet Protocol (VoIP) telephony services, video on demand (VOD) services (e.g., allowing users to select and watch/listen to video or audio content), etc. Example cable network 200 includes controller 210 (e.g., policy server) that may initiate control point discovery with multiple control points 220-1 and 220-2 (e.g., CMTS nodes). Control points (e.g., 220-1 and 220-2) manage endpoints, which may be cable modems (e.g., 230-1 to 230-3), or CPE (e.g., 240-1 to 240-4) that are connected to the control points via respective cable modems.

For example, control point 220-1 manages cable modems 230-1 to 230-3, CPE 240-1 connected via cable modem 230-1, CPE 240-2 connected via cable modem 230-2, and CPE 240-3 and 240-4 connected via cable modem 230-3. On the other hand, control point 220-2 manages cable modem 230-4 and connecting CPE 240-5. In the following examples, control points 220-1 to 220-2 will be collectively referred to as "control points 220" or individually as a general "control point 220." Similarly, CPE 240-1 to 240-5 will also be collectively referred to as "CPE 240" or individually as a general "CPE 240." Cable modems 230-1 to 230-4 will also be collectively referred to as "cable modem 230" or individually as a general "cable modem 230." A general CPE 240 or cable modem 230 may also be referred to as "endpoint 230/240". In plural form, "endpoints 230/240" may represent multiple cable modems 230, multiple CPE 240 or a combination of both.

Cable modems 230 serve as access devices that connect CPE 240 with control point 220 using any suitable access technology, such as Data-Over-Cable Service Interface Specification (DOCSIS) that provides access over hybrid fiber-coaxial (HFC) network. In this case, control points 220 may forward data between upstream and downstream channels on the HFC network. Although not shown, there may be additional network elements connecting control points 220 and cable modems 230, such as amplifiers, optical nodes, etc.

Cable modems 230 and CPE 240 may be located at a subscriber's premise (e.g., home or office, etc.). Each cable modem 230 may be connected to multiple CPE 240 forming a home network or local area network (LAN) at the subscriber's premise, such as cable modem 230-3 connecting to CPE 240-3 and 240-4. CPE 240 may be any suitable client or user device, such as tablet computer, laptop computer, smartphone, telephone, gaming console, set-top box (STB), video and/or voice communication terminal, etc. Further, any suitable communications protocol may be used, such as Internet Protocol version 4 (IPv4), IP version 6 (IPv6), etc.

CPE 240 may access services provided by application server 250 (also known as an application manager) via control points 220 and controller 210. For example, when CPE 240-3 accesses a service provided by application server 250, controller 210 may receive a new request from application server 250 to apply a controlling function on control point 220 managing CPE 240-3. Although two control points 220 are shown in FIG. 2 for simplicity, in practice, there may be hundreds, if not thousands, of control points 220 deployed in cable network 200. As such, in order to apply the controlling function, controller 210 performs control point discovery to discover information concerning associations between control points 220 and endpoints 230/240.

As indicated at 260 in FIG. 2, controller initiates control point discovery with control point 220 according to block 110 in FIG. 1. In other words, controller 210 acts as a "requestor" of information necessary to apply a controlling function on control point 220. The controlling function applied by controller 210 may be for any suitable purpose, such as to support quality of service (QoS) operations using Packet Cable Multimedia (PCMM) or Packet Cable Dynamic Quality of Service (DQoS), etc. The controlling function may be for electronic surveillance operations, such as content tapping using Packet Cable Lawful Intercept (LI) architecture, etc.

PCMM is specified in document "Packet Cable Specification, Multimedia Specification, PKT-SP-MM-106-110629, Dated Jun. 29, 2011", DQoS in Packet Cable 1.5, Dynamic Quality of Service. PKT-SP-DQOS1.5-I03-070412, dated Apr. 12, 2007" and electronic surveillance operations in "Packet Cable Electronic Surveillance Intra-Network Functions Specification, PKT-SP-ES-INF-I04-080425, dated Apr. 25, 2008." These documents are incorporated herein by reference.

As indicated at 270 in FIG. 2, in response to the initiation of control point discovery, control point 220 responds with an IPDR or SNMP message that includes registration information of endpoint 230/240 according to blocks 110 and 120 in FIG. 1. As such, instead of necessitating the replacement or upgrade of control point 220 to support a new protocol (e.g., NLS), example process 100 may take advantage of IPDR or SNMP.

In practice, control point 220 generally already supports IPDR and/or SNMP, both of which are used for management purposes to collect statistics for performance management. For example, SNMP is primarily a polling-based protocol for performance monitoring and network element management (e.g., based on the collection of cable modem 230 and control point 220 statistics, etc.). IPDR, on the other hand, provides information about IP-based service usage. Conventionally, IPDR is generally used for accounting purposes, such as offline billing based on service usage information. Any suitable IPDR-related approach may be used. For example, IPDR/SP is a streaming protocol (SP) that supports a more efficient mechanism to transfer statistics of control point 220 using connection-oriented streams. Besides IPDR/SP, IPDR information may be transferred using any suitable transfer protocol, such as File Transfer Protocol (FTP), Hypertext Transfer Protocol (HTTP), etc. As will be explained using examples in FIG. 3 to FIG. 5. IPDR and SNMP may be further used for control point discovery according to example process 100 in FIG. 1.

IPDR-Based Control Point Discovery

Figure 3:
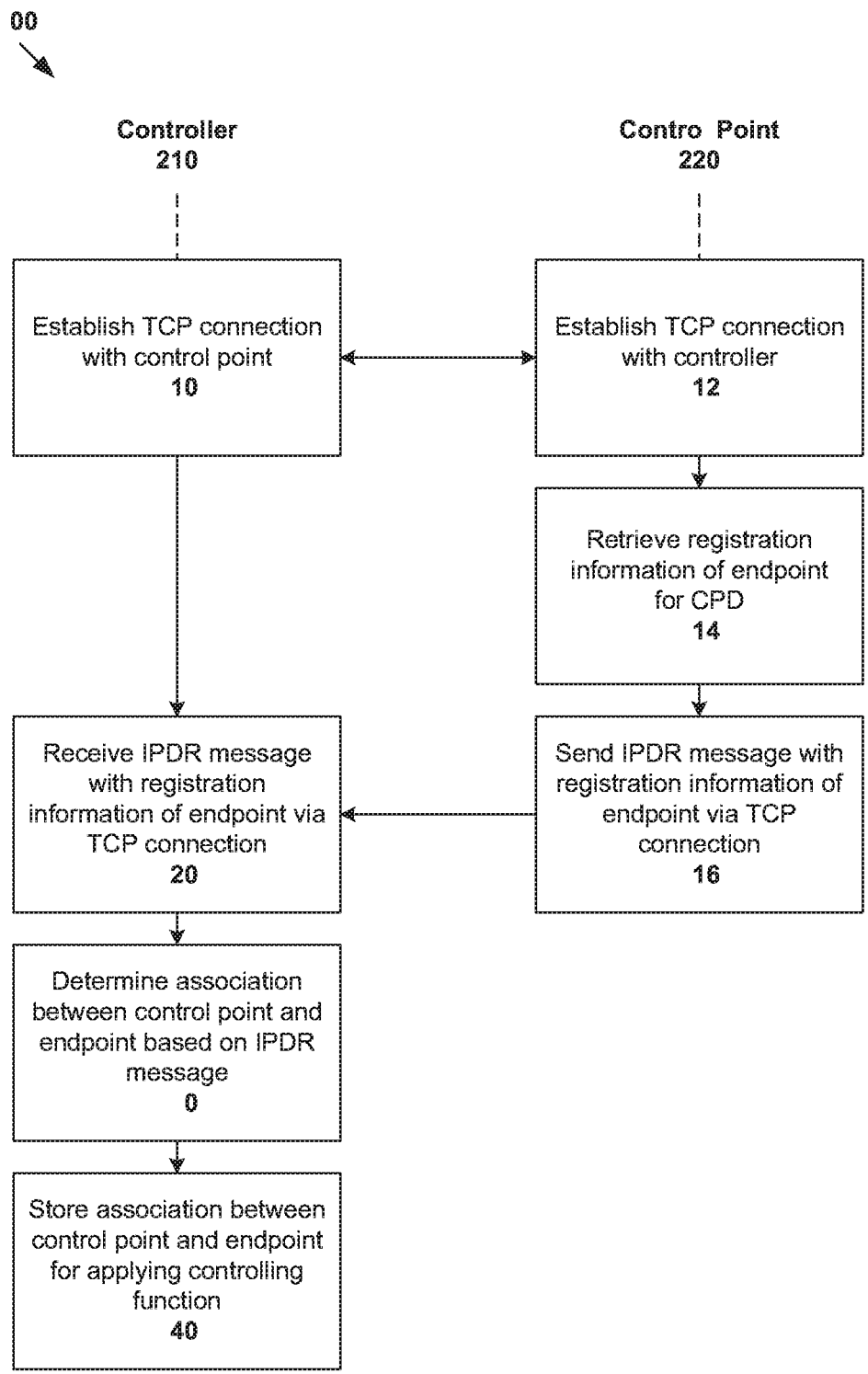
FIG. 3 is a flowchart of an example process for control point discovery based on Internet Protocol Detail Record (IPDR)

FIG. 3 is flowchart of example process 300 for control point discovery based on IPDR. Process 300 may include one or more operations, functions, or actions illustrated by one or more blocks, such as blocks 310 to 340. The various blocks may be combined into fewer blocks, divided into additional blocks, and/or eliminated based upon the desired implementation.

At block 310 in FIG. 3 (related to block 110 in FIG. 1), controller 210 initiates control point discovery by establishing a Transport Control Protocol (TCP) connection with control point 220. The TCP connection is established for control point 220 to push registration information of endpoint 230/240 managed by control point 220. At blocks 312 to 318 in FIG. 3 (related to block 110 in FIG. 1), control point 220 establishes the TCP connection, retrieves necessary registration information of endpoint 230/240 and sends an IPDR message to controller 210. In practice, any suitable approach to establish the TCP connection may be used. For example, in an active mode, controller 210 may actively establish the TOP connection by sending a request to control point 220. Alternatively, in a passive mode, controller 210 may wait for control point 220 to establish the TCP connection.

Since controller 210 collects information from control point 220, controller 210 may be known as an "IPDR collector" and control point 220 as an "IPDR Exporter." IPDR may be used to support scalable solutions for the collection of high volume management data related to performance generating, usage and operation status of cable network 200. For example, in the case of streaming protocol IPDR/SP, reduced computing resources are required at control point 220 when comparable data sets (e.g., compared with SNMP).

The IPDR message at blocks 316 may be considered as an IPDR export that includes multiple records. The registration information may be retrieved locally at control point 220, or remotely from another network device (not shown in FIG. 2 for simplicity). The retrieval and sending of registration information by control point 220 is generally time-based, but may also be event-based. For example, blocks 314 to 316 may be performed periodically (e.g., every 5 or 10 minutes, etc.) or when a predefined event occurs (e.g., based on the amount of information collected). These settings may be specified by controller 210 or control point 220 when the TCP connection is established at block 310.

Figure 4:
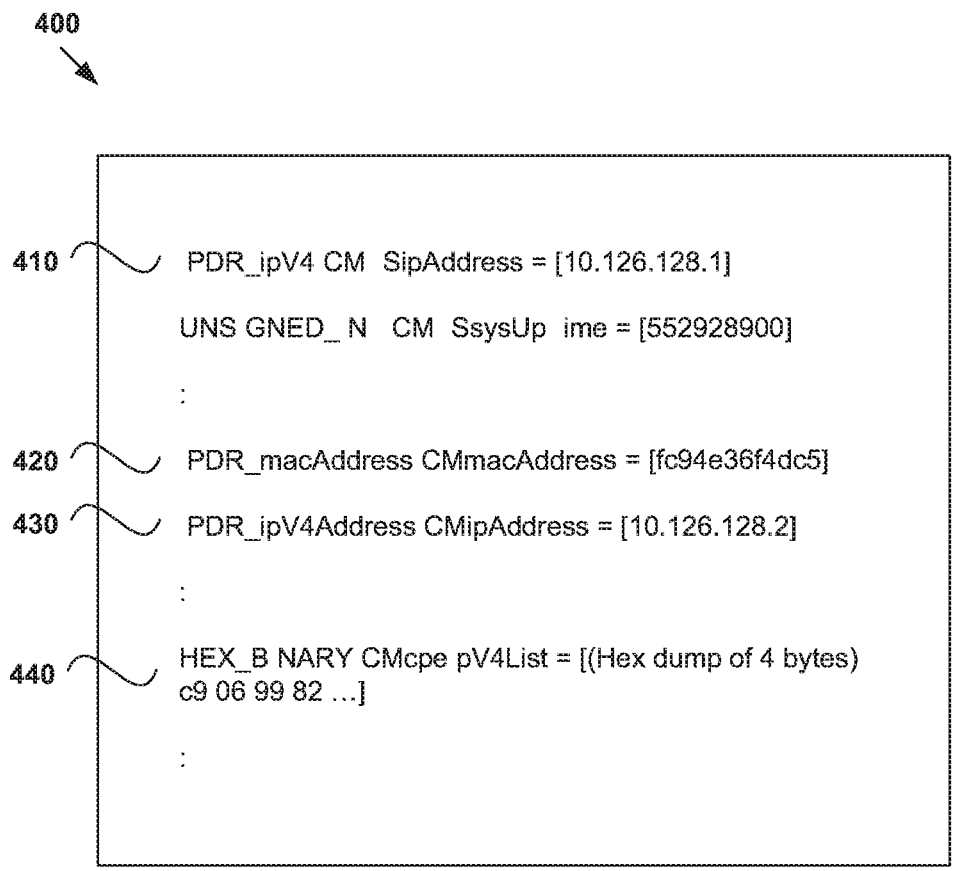
FIG. 4 shows example information in an example IPDR message for control point discovery.

At block 320 in FIG. 3 (related to block 120 in FIG. 1), controller 210 receives the IPDR message with registration information of endpoint 230/240 via the established TCP connection. FIG. 4 shows example information in IPDR message 400 for control point discovery. IPDR message 400 may use any suitable format, such as eXtensible Markup Language (XML) definitions, External Data Representation (XDR), etc. IPDR message 400 may include any suitable registration information of endpoint 230/240, such as IP address of control point 220 (e.g., "10.126.128.1"; see 410), media access control (MAC) address of cable modem 230 (e.g., "fc94e36f4dc5" see 420), IP address of cable modem 230 (e.g., 10.126.128.2; see 430), and a list of CPE 240 (e.g., CPE 240-3 and 240-4 in FIG. 2) connected to cable modem 230 (e.g., cable modem 230-3). See "c9 06 99 82 . . . " at 440 in FIG. 4, which represents an IPv4 address of a CPE 240 in hexadecimal format, etc.

At blocks 330 and 340 in FIG. 3 (related to block 130 in FIG. 1), controller 210 determines an association between control point 220 and endpoint 230/240 based on the IPDR message. Using the examples in FIG. 2, an IPDR message from control point 220-1 may include MAC address and IP address of cable modem 230-3, and a list of its connecting CPE 240-3 and 240-4. By analysing such registration information in the IPDR message, controller 210 may determine and store a first association between control point 220-1 and CPE 240-3, and a second association between control point 220-1 and CPE 240-4.

Alternatively or additionally, controller 210 may determine and store a third association between control point 220-1 and cable modem 230-3. When CPE 240-3 or cable modem 230-3 accesses a service provided by application server 250, controller 210 may receive a policy request from application server 250. The policy request may include address information of CPE 240-3 or cable modem 230-3, or both. Based on information relating to the associations between control point 220-1 and CPE 240-3 and/or between control point 220-1 and cable modem 230-3, controller 210 may then apply a controlling function on control point 220-1.

For example, the controlling function may be a "gate rule" that represents a policy-based authorization for a specific envelope of network resources characterized by a suite of QoS parameters, as well as classifiers for originating and terminating IP addresses and ports. The association determined and stored by controller 210 may be used to facilitate installation of gate rules on the correct control point 220 to control access of data flow from or to endpoint 230/240. A gate rule may identify a subscriber using the address of CPE 240-3 or address of connecting cable modem 230-3, which allows controller 210 to identify CPE 240-3 or cable modem 230-3 and associated control point 220-1 for which the gate rule is applied. If the address of cable modem 230-3 is set out, the gate rule applies to all of its connecting CPE 240-3 and 240-4.

The gate rule may also include other elements such as a handle for the gate rule ("GateID"), a handle that identifies an application manager and application type supported by application server 250 ("AMID"), a traffic profile that describes QoS attributes ("Traffic Profile") of a service flow, classifier describing an IP flow or IP flows that will be mapped to the service flow ("Classifier"), authorization parameters defining a Gate ("GateSpec"), etc. The gate rule may be installed using any suitable protocol, such as Common Open Policy Service (COPS), etc.

Blocks 310, 320, 330 and 340 may be repeated by controller 210 for control point 220-2, which then perform blocks 312, 314 and 316 to send IPDR messages to controller 210 to determine the relevant control point-endpoint associations in cable network 200. In some examples, blocks 310 and 312 may be skipped if a TCP connection has previously established between controller 210 and control point 220-2. After control point discovery, controller 210 may learn that CPE 240-1 to 240-4 and cable modems 230-1 to 230-3 are associated with control point 220-1, and CPE 240-5 and cable modem 230-4 with control point 220-2.

Information relating to the associations may be stored at block 340 in a local or remote storage accessible by controller 210. As cable network 200 changes, information relating to the association may be updated. For example, when cable modem 230 (e.g., 230-3) that connects CPE 240 (e.g., 240-3) to control point 220 (e.g., 220-1) is unregistered, information relating to the previously stored association is removed from storage.

SNMP-Based Control Point Discovery

Figure 5:
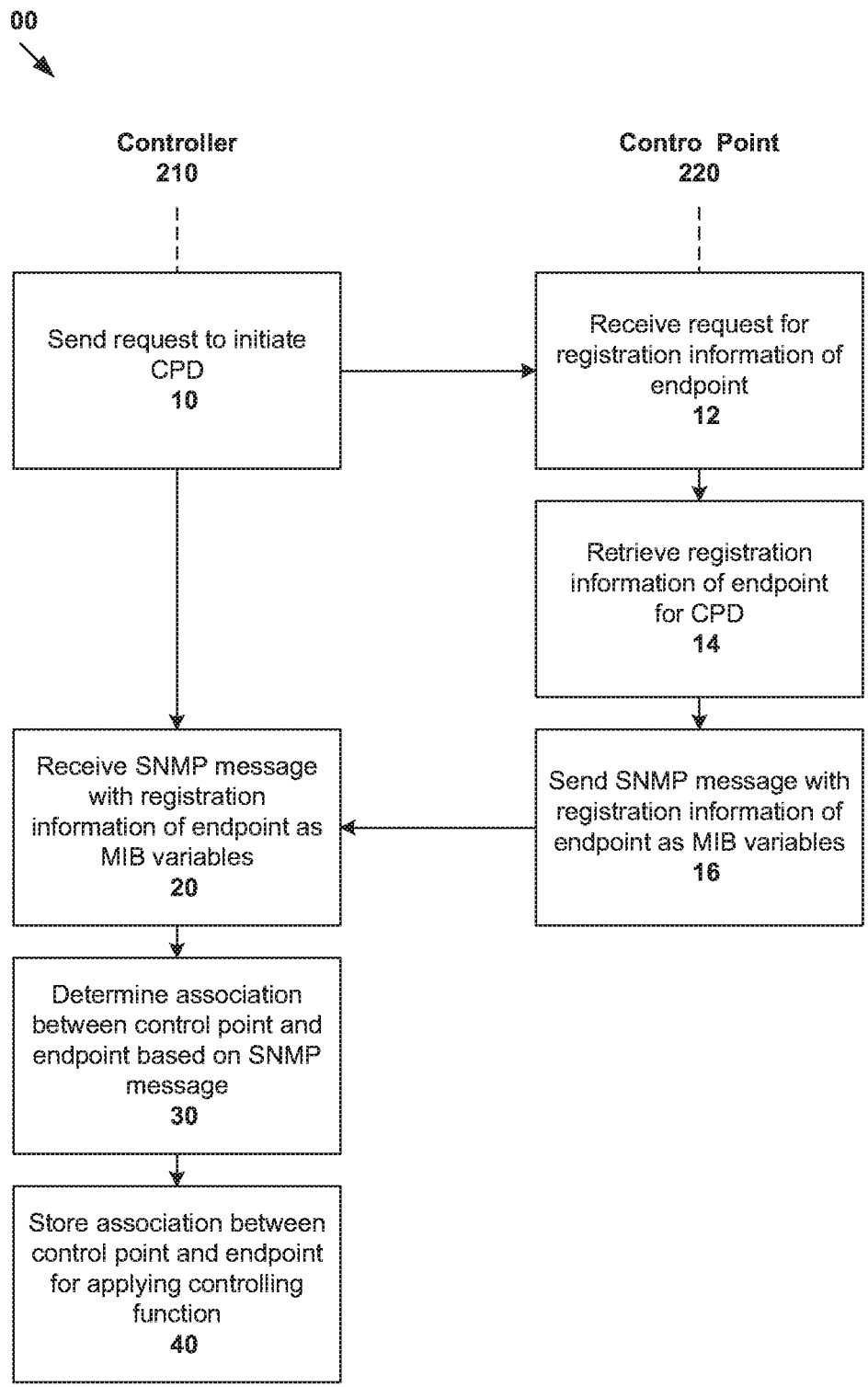
FIG. 5 is a flowchart of an example process for control point discovery based on Simple Network Management Protocol (SNMP)

FIG. 5 is flowchart of example process 500 for control point discovery using SNMP, Process 500 may include one or more operations, functions, or actions illustrated by one or more blocks, such as blocks 510 to 540. The various blocks may be combined into fewer blocks, divided into additional blocks, and/or eliminated based upon the desired implementation.

At block 510 in FIG. 5 (related to block 110 in FIG. 1), controller 210 initiates control point discovery by sending an SNMP request to control point 220. For example, the SNMP request is to request for registration information of all endpoints 230/240 connected to control point 220 (e.g., 220-1). Compared to the IPDR-based examples in FIG. 3 and FIG. 4, the SNMP-based approach uses a pull model to obtain the information. Any suitable SNMP version may be used (e.g., depending on the capability of control point 220), such as SNMPv1, SNMPv2, SNMPv3, or any other version that supports the SNMP-related capabilities described throughout the present disclosure.

At blocks 512, 514 and 516 in FIG. 5 (related to block 110 in FIG. 1), control point 220 receives the SNMP request, retrieves registration information of CPE 240 and sends an SNMP message with the registration information to controller 210. The registration information may be retrieved locally at control point 220, or remotely from another network device (not shown in FIG. 2 for simplicity).

At block 520 in FIG. 5 (related to block 120 in FIG. 1), controller 210 receives the SNMP message with registration information of CPE 240. The registration information may be defined as management information base (MIB) variables in the SNMP message. At blocks 530 and 540 in FIG. 5 (related to block 130 in FIG. 1), controller 210 determines association between control point 220 and endpoint (e.g., CPE 240 or cable modem 230) based on the SNMP message.

Figure 6A:
FIG. 6A and FIG. 6B show example information in example SNMP messages for control point discovery according to a general management information base (MIB) definition and a vendor-specific MIB definition, respectively.

To retrieve the registration information at block 510, the SNMP request sent by controller 210 may be to query an MIB table that is accessible by control point 220. The result of the query is stored in the SNMP message received by controller at block 520. FIG. 6A shows example information in an SNMP message for control point discovery according to a general MIB definition 600. An example general MIB definition is specified in document "Radio Frequency (RF) Interface Management Information Base for MCNS/DOCSIS compliant RF interfaces", The Internet Society, dated August 1999. This document is incorporated herein by reference. MONS represents "Multimedia Cable Network System", which is generally replaced in usage by DOCSIS.

In the example in FIG. 6A, the information is structured according to a set of "objects" arranged in a tree structure. The objects are generally used for the management of control point 220 and cable modem 230 interfaces. For example, at 610, root object "docsIfMib" may represent the entire MIB. At 620, child object "docsIfMibObjects" may represent objects in the MIB, and at 630, grandchild object "docsIfBaseObjects" may represent a group of objects relating to cable modems 230 and control point 220. Within the group, table "docsIfCmtsCmStatusTable" (see 632) may hold information about cable modems 230 serviced by a particular control point 220.

Registration information of endpoint 230/240 may be retrieved by querying "docsIfCmtsCmStatusTable" (see 632) with entries defined using object "docsIfOmtsCmStatusEntry" (see 634). Each entry may include the following information. At 636, object "docsIfCmtsCmStatusMacAddress" specifies MAC address information of endpoint 230/240. At 638, IP address information of endpoint is specified using object "docsIfCmtsCmStatusIpAddress." Although some example objects are discussed with reference to FIG. 6A, it will be appreciated that other objects that hold similar information may be used to retrieve the registration information at block 510.

Figure 6B:

Further, although an example general MIB definition is shown in FIG. 6A, it will be appreciated that any suitable vendor-specific MIB definition may be used in practice. FIG. 6B shows example information in an SNMP message for control point discovery according to a vendor-specific MIB definition 640. Similar to the example in FIG. 6A, the information in FIG. 6B is arranged as objects in a tree structure, such as parent object "cdxCmtsCmCpeObjects" (see 650) with child object "cdxCpetoCmTable" (see 660) that includes information about cable modems 230 or CPE 240 in a table.

Within "cdxCpetoCmTable" (see 660), each table entry may be defined using grandchild object "cdxCpetoCmEntry" (see 670) that includes the following information. At 672 (related to 636 in FIG. 6A), "cdxCpeToCmMacAddress" specifies the MAC address of endpoint (e.g., cable modem 230-3). At 674 (related to 638 in FIG. 6A), "cdxCpeToCmInetAddress" specifies the IP address of endpoint (e.g., cable modem 230-3), etc.

Using the examples in FIG. 5 to FIG. 6B, controller 210 in FIG. 2 may analyse the SNMP message from control point 220-1 to learn that CPE 240-3 and/or cable modem 230-3 are connected to control point 220-1. Controller 210 may then store information relating to the association between control point 220-1 and CPE (e.g., 240-3) and/or association between control point 220-1 and cable modem (e.g., 230-3) to apply a controlling function when necessary.

For example, when CPE 240-3 accesses a service provided by application server 250, controller 210 may receive a policy request from application server 250 that includes the address information of CPE 240-3 and/or cable modem 230-3. Since controller 210 has previously stored information relating to the relevant associations, controller 210 may then apply a controlling function on control point 220-1 associated with CPE 240-3 and cable modem 230-3.

Blocks 510, 520, 530 and 540 may be repeated by controller 210 for control points 220-2, which then perform blocks 512, 514 and 516 to send SNMP messages to controller 210. After control point discovery, controller 210 may learn that CPE 240-1 to 240-4 and cable modems 230-1 to 230-3 are associated with control point 220-1, and CPE 240-5 and cable modem 230-4 with control point 220-2.

Information relating to the associations may be stored at block 540 in a local or remote storage accessible by controller 210. As cable network 200 changes, information relating to the association may be updated. For example, when cable modem 230 (e.g., 230-4) that connects CPE 240 (e.g., 240-3) to control point 220 (e.g., 220-1) is unregistered, information relating to the previously stored association is removed from storage.

Computer System

Figure 7:
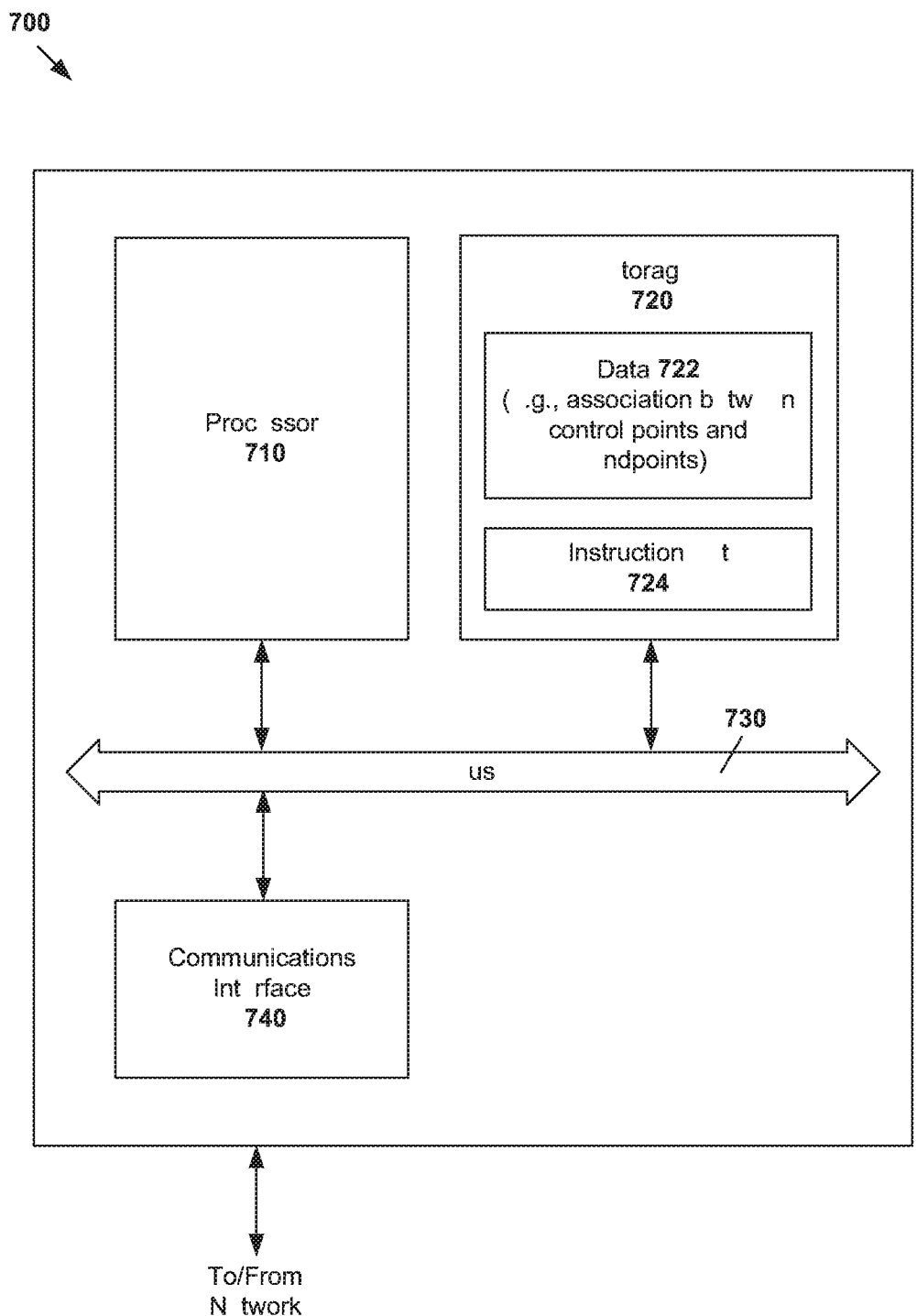
FIG. 7 is a schematic diagram of an example computer system for control point discovery.

FIG. 7 is a schematic diagram of example computer system 700 capable of acting as controller 210 or control point 220 for control point discovery according to examples described with reference to FIG. 1 to FIG. 6B. Example computer system 700 may include processor 710, computer-readable storage medium 720, peripherals interface 740, communications interface 750, and bus 730 that facilitates communication among these illustrated components and other components.

Processor 710 is to perform processes described herein with reference to FIG. 1 to FIG. 6B. Computer-readable storage medium 720 may store any suitable data 722, such as information relating to association between control points 220 and endpoints 240, etc. Computer-readable storage medium 720 may further store instructions set 724 to cooperate with processor 710 to perform processes described herein with reference to FIG. 1 to FIG. 6B.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a computer-readable storage medium includes recordable/non recordable media (e.g., read-only memory (ROM), random access memory (RAM), magnetic disk storage media, optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

As used herein, the terms "including" and "comprising" are used in an open-ended fashion, and thus should be interpreted to mean "including, but not limited to . . . ." Also, the term "couple" or "couples" is intended to mean either an indirect or direct connection. Thus, if a first device communicatively couples to a second device, that connection may be through a direct electrical or mechanical connection, through an indirect electrical or mechanical connection via other devices and connections, through an optical electrical connection, or through a wireless electrical connection.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method, comprising:
 establishing, by a controller, a connection to a control point within a cable network;
 in response to establishing the connection, the controller automatically initiating, with a cable modem termination system (CMTS) of the control point, control point discovery to dynamically discover one or more endpoints within the cable network that are managed by the CMTS of the control point, including specifying to the CMTS a non-temporal event responsive to which the CMTS is to provide registration information of the one or more endpoints, wherein the non-temporal event comprises a specified amount of information collected by the CMTS of the control point;
 the controller receiving, from the CMTS of the control point, Internet Protocol Detail Record (IPDR) messages including the registration information of the one or more endpoints in response to the non-temporal event occurring at the CMTS; and
 based on the registration information of the one or more endpoints from the IPDR messages, the controller dynamically discovering the one or more endpoints within the cable network that are managed by the CMTS of the control point and determining an association between the CMTS of the control point and the one or more endpoints to allow the controller to apply a controlling function on the CMTS when the one or more endpoints access a service via the CMTS of the control point.

2. The method of claim 1, wherein
 establishing the connection comprises a transport control protocol (TCP) connection with the control point for the CMTS of the control point to push the IPDR messages to the controller via the TCP connection.

3. The method of claim 2, wherein the one or more endpoints comprise a cable modem connected to the CMTS of the control point or a customer premise equipment (CPE) connected to the CMTS of the control point via the cable modem; and the IPDR messages comprise at least one of the following:
 Internet Protocol (IP) address information of the CMTS, IP address information of the endpoint, media access control (MAC) address information of the endpoint, and a list of CPE connected with the cable modem.

4. The method of claim 1, wherein the controller is a policy server and the service accessed by the one or more endpoints is supported by an application server connected to the CMTS of the control point via the policy server.

5. The method of claim 4, further comprising:
 receiving, from the application server, a policy request that includes information of the one or more endpoints accessing the service; and
 based on the policy request and the association between the CMTS of the control point and the one or more endpoints, applying the controlling function on the CMTS, wherein the controlling function comprises a gate rule to control access of data flow from or to the one or more endpoints.

6. The method of claim 1, further comprising:
 storing, in a storage of the controller, information relating to the association between the CMTS of the controller and the one or more endpoints; and
 in response to determining that a cable modem connecting the one or more endpoints to the CMTS is unregistered from the CMTS of the control point, removing the information relating to the association of the unregistered endpoints from the storage.

7. A computer system, comprising:
 a processor;
 a communications interface to communicate with a cable modem termination system (CMTS) of a control point; and
 an instructions set to cooperate with the processor to:
 establish a connection to a control point within the cable network;
 in response to establishing the connection, automatically initiate, with the CMTS of the control point via the communications interface, control point discovery to dynamically discover one or more endpoints within the cable network that are managed by the CMTS of the control point, including specifying to the CMTS a non-temporal event responsive to which the CMTS is to provide registration information of the one or more endpoints, and wherein the non-temporal event comprises a specified amount of information collected by the CMTS of the control point;
 receive, from the CMTS of the control point via the communications interface, Internet Protocol Detail Record (IPDR) messages including the registration information of the one or more endpoints in response to the non-temporal event occurring at the CMTS; and
 analyse the registration information of the one or more endpoints from the IPDR messages to:
 dynamically discover the one or more endpoints within the cable network that are managed by the CMTS of the control point; and
 determine an association between the CMTS of the control point and the one or more endpoints to apply a controlling function on the CMTS when the one or more endpoints accesse a service via the CMTS of the control point.

8. The computer system of claim 7, wherein the establishing the connection comprises establishing a transport control protocol (TCP) connection with the CMTS for the CMTS of the control point to push the IPDR messages via the TCP connection.

9. The computer system of claim 8, wherein the one or more endpoints comprise a cable modem connected to the CMTS of the control point or a customer premise equipment (CPE) connected to the CMTS of the control point via the cable modem; and the IPDR messages comprise at least one of the following:

Internet Protocol (IP) address information of the CMTS of the control point, IP address information of the endpoint, media access control (MAC) address information of the endpoint, and a list of CPE connected with the cable modem.

10. The computer system of claim 9, wherein:

the controller is a policy server and the service accessed by the CPE is supported by an application server connected to the CMTS of the control point via the policy server; and the controlling function on the CMTS comprises gate rules to control access of data flow from the CPE and the one or more endpoints.

11. A non-transitory machine-readable storage medium encoded with instructions executable by a processor, which when executed cause the processor to:

establish a connection to a control point within a cable network;

in response to establishing the connection, automatically initiate, with a cable modem termination system (CMTS) of the control point, control point discovery to dynamically discover one or more endpoints within the cable network that are managed by the CMTS of the control point, including specifying to the CMTS a non-temporal event responsive to which the CMTS is to provide registration of the one or more endpoints, wherein the one or more endpoints comprise a cable modem connected to the CMTS of the control point or a customer premise equipment (CPE) connected to the CMTS of the control point via the cable modem, and wherein the non-temporal event comprises a specified amount of information collected by the CMTS of the control point;

receive, from the CMTS of the control point, Internet Protocol Detail Record (IPDR) messages including the registration information of the one or more endpoint in response to the non-temporal event occurring at the CMTS of the control point; and based on the registration information of the one or more endpoints from the IPDR messages, dynamically discover the one or more endpoints within the cable network that are managed by the CMTS of the control point and determine an association between the CMTS of the control point and the one or more endpoints to apply a controlling function on the CMTS when the one or more endpoints access a service via the CMTS of the control point.

* * * * *